Dec. 31, 1957  J. B. STEVENS  2,818,284
SHAFT SEAL
Filed May 19, 1954
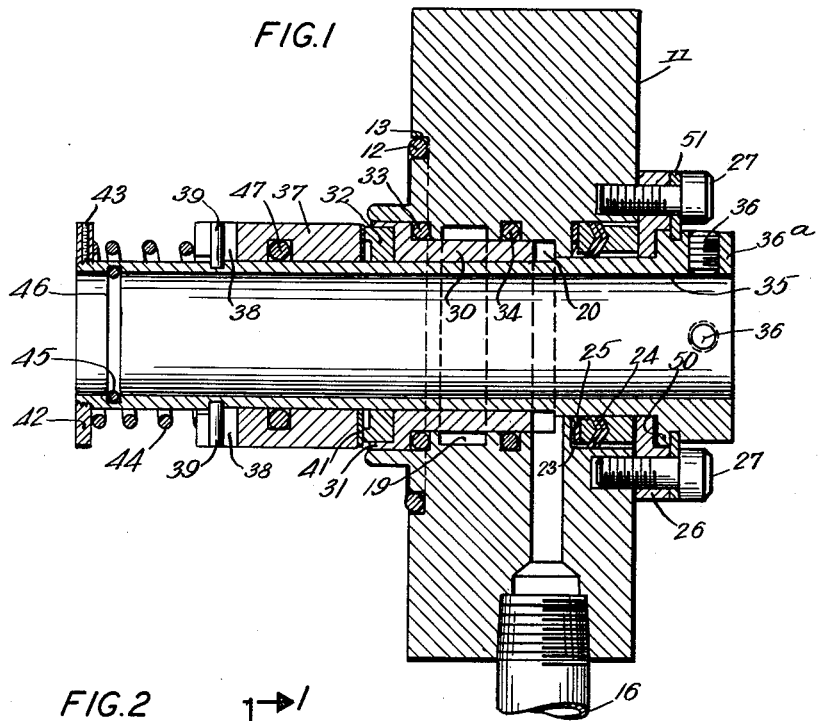
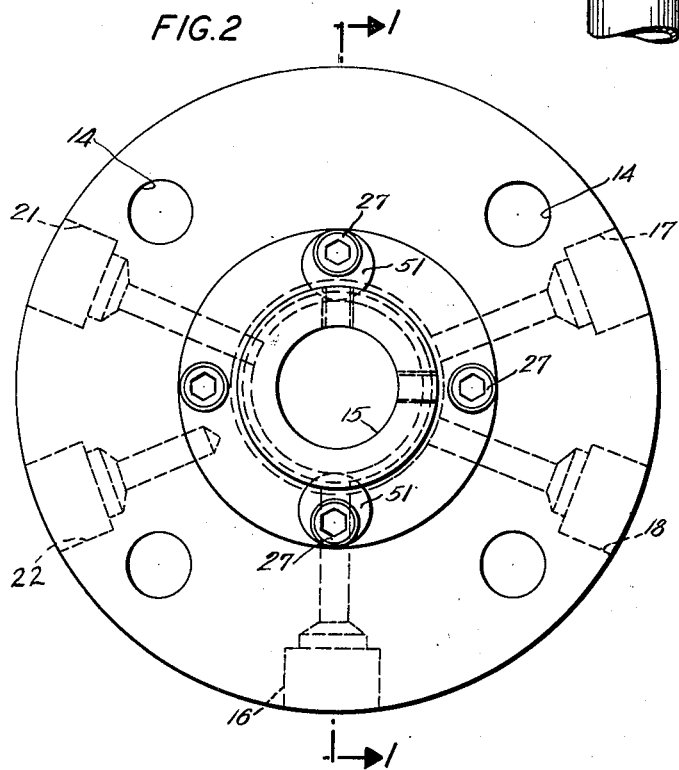
INVENTOR
JUSTUS B. STEVENS
BY Rowland V. Patrick
ATTORNEY United States Patent Office 2,818,284
Patented Dec. 31, 1957

2,818,284
SHAFT SEAL

Justus B. Stevens, Riverside, R. I., assignor to Sealol Corporation, Providence, R. I., a corporation of Rhode Island Application May 19, 1954, Serial No. 430,753

5 Claims. (Cl. 286—11.15)

This invention relates to a shaft seal for preventing fluid leakage around a rotating shaft passing through a housing or casing and pertains more specifically to a stuffing box seal.

One object of this invention is to provide means for facilitating the assembly of a unitary device having a rotary type seal for insertion between a shaft and its housing.

Another object is to provide means for temporarily locking the relatively rotatable parts of a seal unit in a preset axial relation with respect to each other so as to obtain the designed minimum pressure across the running seal of the device without the necessity for measurement and careful axial setting of the parts relative to each other at the time of attachment of the parts to a housing and shaft therefor, as in a stuffing box.

Still another object is to provide a rotatable detent releasably secured to one part of a sealing unit so as to be readily turned from a position in which it engages the other relatively rotatable parts of the sealing unit to maintain them in a preset axially fixed position during attachment to a shaft and housing, to a position in which it is no longer in such engagement. It hence operates as a temporary axial lock until the parts are attached, after which it is discarded or rendered ineffectual.

Other and further objects will be apparent from the drawing and from the description which follows.

In the drawing:

Fig. 1 is a longitudinal section of a shaft seal constructed in accordance with the present invention taken along the line 1—1 of Fig. 2; and Fig. 2 is an end elevation of the device.

As shown in the drawings, one embodiment of the invention includes a housing 11 provided with a O-ring 12 seated in an annular channel 13 and serving to seal one face of the housing to a stuffing box or the like (not shown) by means of bolts passing through bolt holes 14. Housing 11 is also provided with a central aperture 15 with a drain vent 16 serving to drain any accumulated liquid from an annular internal channel 20. The housing also includes inlet port 17 and outlet port 18 connecting with cooling channel 19 through which a cooling medium may be circulated. Vent port 21 is also provided in the housing together with a circulating port 22 through which additional cooling medium may be circulated through the housing and stuffing box. Within the central aperture 15 and adjacent the outer face of the housing there is provided a channel or recess 23 in which any suitable soft packing, such as Chevron packing 24 may be inserted on top of a distorted ring type spring 25. Clamping ring 26 is provided at the outer face of housing 11 and secured thereto by means of bolts 27.

Adjacent the opposite face of housing 11 there is disposed within the central aperture an annular sealing member 30 which has around its outer margin an upstanding flange 31 within which is seated by a press fit an annular sealing surface 32. Sealing member 30 is sealed to the housing by means of O-rings 33, 34.

Disposed concentrically within sealing member 30 is sleeve member 35 provided with socket-headed set screws 36, 36 in flange 36a adjacent one end for securing the sleeve member to the rotatable shaft. Encircling the sleeve member 35 is a second sealing member 37 provided with axial slots 38, 38 through which pins 39, 39 extend into sleeve member 35, thus holding sealing member 37 for rotation with sleeve member 35 but permitting limited axial movement of the sealing member. The end of sealing member 37 adjacent sealing member 30 is provided with an annular sealing surface 41 which opposes fixed sealing surface 32 and rides thereagainst in sealing engagement forming a radial seal as sealing member 37 is rotated with sleeve member 35 and with the rotatable shaft.

The end of sleeve member 35 adjacent sealing member 37 is provided with a flange or retaining ring 42 threaded on the end of the sleeve member and held in place by set screw 43. Between retaining ring 42 and the end of sealing member 37 is provided a compression coil spring 44 which encircles sleeve member 35 and serves to urge sealing member 37 against sealing member 30. O-ring 45 set in an internal annular channel 46 in sleeve member 35 serves to seal the latter to the shaft, and O-ring 47 similarly provides a seal between sealing member 37 and sleeve member 35.

Adjacent its other end sleeve member 35 carries an annular external channel or groove 50 in which a portion of eccentric washers 51, 51 ride, the washers being held in place on the housing by means of bolts 27.

It will be seen that the device comprises two relatively rotatable assemblies, one assembly being adapted for attachment to and rotation with the shaft and including sleeve member 35, sealing member 37, retaining ring 42, and spring 44. The other assembly, which is adapted to be secured to the stuffing box, includes housing 11, sealing member 30, clamping ring 26 with its associated packing 24 and eccentric washers 51, 51. The first assembly axially embraces the second.

In assembling the device of the preset invention, packing 24 together with spring 25 and sealing member 30 are first inserted in the housing, compression ring 26 is placed over the packing, sleeve member 35 is then inserted through the central aperture and bolts 27 are tightened with the eccentric washers 51 in the position shown in the drawing in order to lock sleeve member 35 temporarily in fixed axial relation to housing 11 with a predetermined small clearance between shoulder 36a of the sleeve member 35 and the outer face of compression ring 26. Sealing element 37 is then slipped over the end of sleeve member 35, compression spring 44 is placed in position and retaining ring 42 is threaded on the other end of the sleeve to compress the spring and urge sealing member 37 against sealing member 30 under a predetermined loading. The device may then be slid endwise over the shaft and bolted to a stuffing box or the like by means of bolts passing through bolt holes 14, and set screws 36 are tightened to secure the sleeve member to the shaft. Bolts 27 are then loosened slightly to permit washers 51, 51 to be turned through approximately 180°, thus clearing sleeve member 35. Bolts 27 are then tightened again to compress packing 24 and urge it radially inwardly against sleeve member 35, and the device is ready for operation, the loading of spring 44 being the same after release of washers 51, 51 as it was before, and the clearance between shoulder 36a and compression ring 26 being preserved to permit rotation of the sleeve member 35 without binding.

A desirable feature of my invention is that inadvertent failure to loosen bolts 27 and rotate washers 51 out of engagement with sleeve member 35 before placing the device in operation will not result in damage to the seal.

Although I have herein described a specific embodiment of my device, I do not intend to limit myself solely thereto, but to include all of the obvious variations and modifications within the spirit and scope of the appended claims.

I claim:

1. A sealing unit for a shaft extending through a housing, said shaft and housing being rotatable with respect to each other, said sealing unit comprising two relatively rotatable assemblies, one for attachment to said housing and one for attachment to said shaft, each assembly including an annular sealing member, said sealing members being arranged in abutting relatively rotatable relation to provide a radial seal between said assemblies, one of said assemblies including a sleeve member having a flange and a spring seated between said flange and the sealing member of the last said assembly, and means rotatable about an axis parallel to and spaced from that of said sleeve member to and from a first position in which it holds said sleeve member of said one assembly in fixed axial relation with respect to the other said assembly to load said spring through said sleeve member to maintain said sealing members at a predetermined engagement during attachment of said unit to a housing and shaft, and a second position in which it releases said sleeve member for moving axially with respect to said last-named assembly.

2. In a sealing unit for a rotatable shaft, said unit having a housing, a pair of relatively rotatable annular sealing members with opposing annular sealing faces forming a radial seal and a sleeve member adapted to be secured to said shaft concentrically within said sealing members, one of said sealing members being mounted on said sleeve member for rotation with said shaft and the other being held against rotation by said housing, the improvement which comprises a detent releasably secured to said housing laterally of said sleeve member and rotatable about an axis parallel to and spaced from that of said sleeve member to and from a position in which it is clear of said sleeve member and a position in which it engages said sleeve member to hold it in axially fixed position with respect to said housing.

3. A sealing unit as defined in claim 2 in which said sleeve member is provided with an external annular groove in which said detent engages.

4. A sealing unit as defined in claim 3 in which said detent is in the form of an eccentric washer bolted to said housnig.

5. A sealing unit for a rotatable shaft in a housing comprising a sleeve member mounted on said shaft including a flange and means for securing said sleeve member to said shaft, an annular sealing member secured to said housing about said sleeve member, a second annular sealing member mounted on said sleeve member for rotation therewith, said sealing members having opposing annular sealing surfaces forming a radial seal, a spring seated between the flange of said sleeve member and said second sealing member for yieldably urging said sealing surfaces toward each other, and locking means for temporarily holding said sleeve member in axially fixed position with respect to said housing during assembly to provide a predetermined loading on said spring through said sleeve member and flange, said locking means including a detent mounted on said housing rotatable about an axis parallel to said sleeve member and laterally offset therefrom to and from a position in which said detent engages said sleeve member and a position in which said detent is clear of said sleeve member, and means for releasably securing said detent in said positions.

References Cited in the file of this patent
UNITED STATES PATENTS

| | | |
|---|---|---|
| 470,397 | Jerome | Mar. 8, 1892 |
| 2,306,417 | Wiessner | Dec. 29, 1942 |
| 2,639,170 | Schick et al. | May 19, 1953 |